(12) United States Patent
Ma

(10) Patent No.: US 7,427,140 B1
(45) Date of Patent: Sep. 23, 2008

(54) SUNLIGHT READABLE DIRECT-VIEW AND PROJECTION-VIEW COMPUTING DEVICE

(76) Inventor: Yao-Dong Ma, 14586 Pensham Dr., Frisco, TX (US) 75035

( * ) Notice: Subject to any disclaimer, the term of this patent is extended or adjusted under 35 U.S.C. 154(b) by 0 days.

(21) Appl. No.: 11/788,096

(22) Filed: Apr. 19, 2007

(51) Int. Cl.
*G02B 5/08* (2006.01)

(52) U.S. Cl. .................. 359/604; 359/602; 359/603; 359/613; 353/30

(58) Field of Classification Search ......... 359/601–614; 353/30
See application file for complete search history.

Primary Examiner—Joshua L Pritchett

(57) ABSTRACT

The present invention relates to a sunlight readable computing device, especially, to a full color direct-view and projection-view computing device. When the computing device works in the direct-view mode, the display panel tilt up to the conventional display position and it has a wide, open viewing angle; when the computing device works in the projection view mode, the display panel tilt down and forms a projection image via a mirror plate with a sufficient high contrast ratio and superior readability even directly under sunshine. The solar ambient light can be utilized as the lighting source in both direct-view and projection-view display modes, thus remarkably reduces the power consumption and substantially prolongs the operation time of the computing device.

20 Claims, 4 Drawing Sheets

SUNLIGHT READABLE DIRECT-VIEW AND PROJECTION-VIEW COMPUTING DEVICE

BACKGROUND OF THE INVENTION

In the information age, portable electronic computing devices, such as note-book computer, lap top computer, hand-held computer, palm book and palm phone etc, have become more and more popular around the world. Internet, wire-less communication, multi-media and nano-semiconductor technologies as well as the variety of software applications are boosting those computing devices with the viewing terminal more vigorously in the new century.

Currently used portable computers are based on the direct-view display technology where the angle between the display panel and the key board panel is always equal or larger than right angle during operation; and the back-lit panel is always attached behind of the display panel. Such computer has the following disadvantages.

1. Ambient light interference. Most computers are not suitable for outdoor applications due to the sun shine wash-out effect. The intensity of the incident sunlight can be many times more than the luminance of the display's back lighting. The intensity of the surface reflection of the sunlight is so high, for example, more than 200 nits, that it will substantially wash-out the displays image. In the indoor environment, on the other hand, the ambient light impinged on the screen causes surface reflection (glare) and degrades the contrast ratio of the display.
2. The back-lit panel attached behind the display panel is the major consumption of the power. Generally, more than half of the electric energy of a computer is consumed by the back-lit system, which requires a bulky battery structure to ensure a predetermined operation time. In the out door application particularly, the battery and the thermo sink structure are so heavy, which makes the portable computing devices impractical.
3. Spatial limitation. While traveling, users often find that it's very inconvenient to operate their computers due to the limitation of space. Sitting in a normal class seat of an airplane, the passenger seat of a car, or a bus, the compact space between front and back chairs restrains the computer in the direct view position where the open angle of the display screen is limited by the tilted back of the front chair.
4. Less privacy. The computer screen is always open to the side-viewers. With the viewing angle of the display is getting larger and larger, people tend to use the viewing angle narrower technology to keep their privacy.

In a word, the traditional direct-view structure of the computer has many limitations in its applications.

SUMMARY OF THE INVENTION

It is the primary object of this invention to create a sunlight readable computing device with direct-view and projection view.

It is another object of this invention to provide the display terminal with a super high contrast ratio.

It is again another object of this invention to make use of an ambient light as a lighting source to illuminate the display in both indoor and outdoor applications.

It is a further object of this invention to create a new input means to facilitate the information input.

It is another object of this invention to provide a free built-in back lighting solution to the computing devices.

It is still another object of this invention to reduce the overall thickness and weight of the computer, which makes it more portable.

It is finally the object of this invention to protect the privacy of the users.

DETAILED DESCRIPTION

Figure 1:
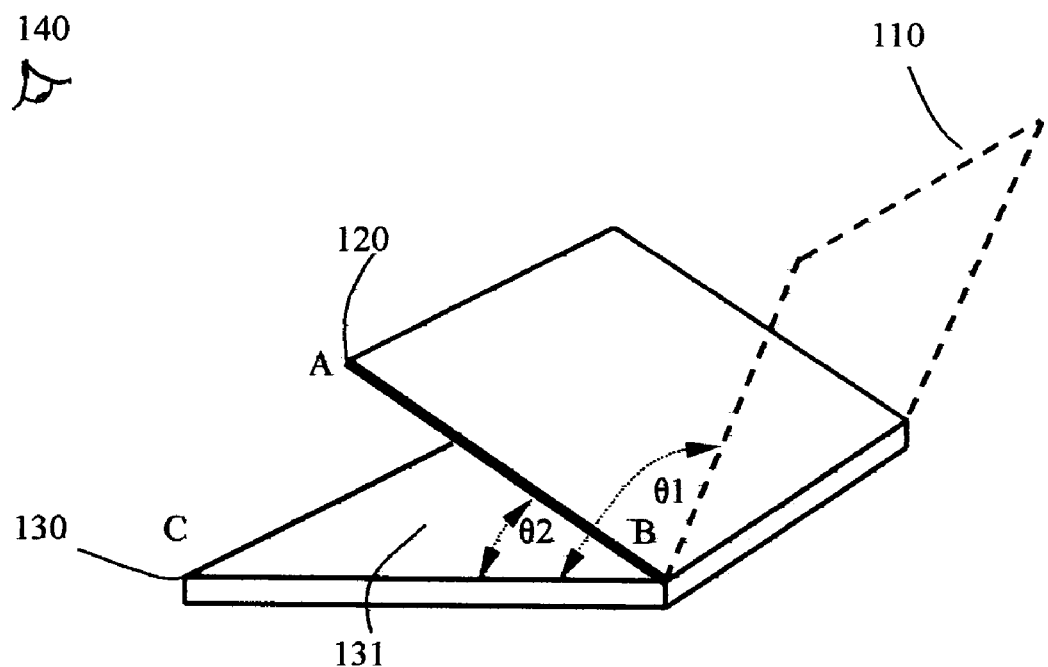
FIG. 1 illustrates schematic drawing of the computer structure in the direct-view and the projection working mode.

Referring first to FIG. 1, illustrated is a schematic drawing of the computer structure in the direct-view and the projection working mode. When the display panel including built-in backlighting system is set in the position 110 at an open angle $\theta_1$, the computer is working in the direct-view mode, a typical prior art display mode. The angle $\theta_1$ is normally larger than 90 degrees, for example, 120 degrees. As mentioned earlier, the direct-view display mode has some disadvantages and application limitations especially in the outdoor applications. The present invention, on the other hand, creates a second working mode, i.e., projection mode, as the display panel turns to the position 120. A flat mirror plate 130 is positioned substantially in parallel with the computer's mother board. The angle, $\theta_2$, between the display panel position 120 and the mirror plate 130 is less than 90 degrees, normally in the range of 40~50 degrees and more specifically, 42 degrees. As an observer 140 looks into the display at a suitable viewing angle, he or she will sense a clear mirror picture 131. Without the ambient light interference, the picture is in such a high quality that it looks as if it were a movie image in cinema. The contrast ratio of the display mode almost matches the data when the display is tested in dark room environment. The superior contrast allows the display with relatively low brightness while maintaining its excellent readability. Thus, the display working in the projection mode not only alleviates human eye fatigue effect but also remarkably reduces the power consumption of the computer.

Besides the physical structure, the CPU is programmed for sending instructions to the controller to convert the direct view image into a correct projection image when the display panel is rotated between angles $\theta_1$ and $\theta_2$. The X source driver will be remaining the same data array in registers and scanning direction to the electrodes while the Y gate driver will be reversed its line index and the scanning direction during the transformation. For example, the first line of the direct-view is the last line of the projection view and the downward scanning in the direct-view is corresponding to the upward scanning of the projection view. In order to realize such functions, the horizontal scanning direction control signal (Rightwards/Leftwards or in short R/L) is set to "High." and the vertical scanning direction control signal (Upwards/Downwards or in short U/D) is set to "Low" in the direct-view mode. While the horizontal scanning direction control signal R/L and the vertical scanning direction control signal U/D are set to "High" and "High" respectively in the projection view mode.

EXPERIMENT 1

In a normal office environment, an AMLCD lap-top computer was placed on a desk for testing the luminance and contrast ratio in both the direct-view and the projection view respectively. The photometer being used is Minolta 100 with the unit preset to candela per square meter ($cd/m^2$) or nit. The result is shown in Table 1.

TABLE 1

|  | White | Black | CR | Reflectivity (%) |
| --- | --- | --- | --- | --- |
| Direct-view | 95.9 | 3.01 | 31.86 |  |
| Projection-view | 86.1 | 0.65 | 132.46 | 89.78 |

It is obvious that the contrast ratio (CR) in the projection-view mode is much higher than that of in the direct-view mode. In other word, the contrast between white and black for the projection-view mode is four times higher than the direct-view mode. Since an Aluminum mirror plate was used in the experiment, the reflectivity of which is normally less than 90%. If the Aluminum mirror plate is replaced by the silver material, the reflectivity will be expected to reach the level of 95%.

Since the computer is operated in out-door environment, a maximum reduction of the surface reflection (glare) is necessary. Traditionally, to be a sunlight readable computer, its display screen on sunlight should be bright enough so that the display is visible and the display contrast ratio must be maintained at least 5:1. A typical AMLCD exhibits a contrast ratio in a range of 100 to 700 when measured in a dark room. However, the contrast on the same unit measured under ambient illumination is drastically lowered due to surface reflection. For example, a standard 200 nit LCD measured in a dark room has a contrast 300:1, but will have less than a 2:1 under strong direct sunlight. This is due to the fact that surface glare increases the luminance by over 200 nits both on the white and the black that are produced on the display screen. The result is that the luminance of the white is slightly over 400 nits, and the luminance of the black is over 200 nits, the contrast ratio then becomes less than 2:1 and the picture quality is drastically reduced.

In the present invention, the computer screen is able to tilt down to a lower open angle, $\theta_2$, when it works in the outdoor environment to avoid the image directly exposed to the sunlight so that the wash-out effect will be substantially reduced. As shown in FIG. 1, the triangle area, $\triangle ABC$, confined by the A, B and C point in both edges of the computer can be covered by the fan-shaped dark cover plates to create a mini dark environment. As a result, the computer image will be sharp enough for the out-door applications.

EXPERIMENT 2

A sunlight readable testing was carried out inside a car at 12:30 pm in Texas. The car was stopped headed to the south. A computer was hand hold in the front passenger seat. Data was collected in both cloudy and clear sky. The computer was in either direct-view mode or in projection-view mode. The black state was measured when the computer was in OFF state; while the white state was measured when the computer was set to a white frame. The photometer being used was the same as example 1. The luminance unit is nit or $cd/m^2$. The testing results is shown in Table 2.

TABLE 2

|  | White | Black | Cr |
| --- | --- | --- | --- |
| Cloudy direct-view | 102 | 26.6 | 3.8 |
| Sunshine direct-view | 113 | 43 | 2.6 |
| Cloudy projection | 71.4 | 3.68 | 19.4 |
| Sunshine projection | 73.6 | 5.56 | 13.2 |

Note, since no side cover plate was placed on the computer during the experiment, there still exists a room for the projection mode to further increase its contrast ratio. From the result of the experiment, one may notice the fact that the contrast ratio of the projection mode is five times better than that of the direct-view mode.

Figure 2:
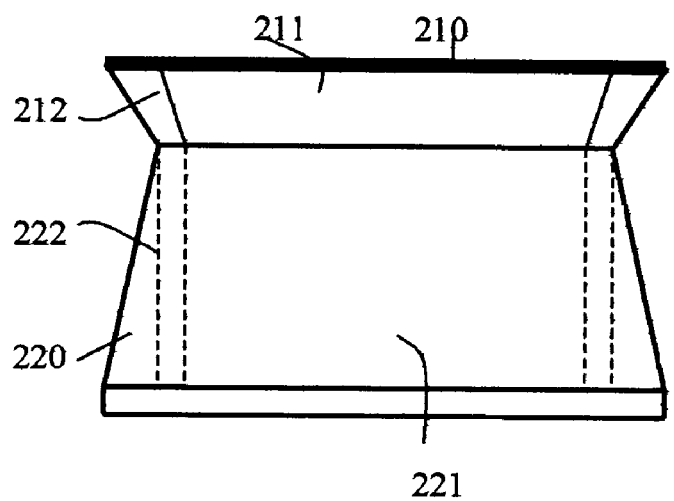
FIG. 2 illustrates schematic front view of the computer with a projected mirror image.

Turning now to FIG. 2, illustrated is a schematic front view of the computer with a projected mirror image. The display panel 210 is tilted to such an angle that the display image is not directly visible, while the projected mirror image is fully captured by the observer. On the flat mirror surface 220, the frame 212 and display area 211 of the display panel is clearly projected to form the virtual frame 222 and the virtual display area 221, respectively. The projection image remains a high fidelity to the original display image in terms of the dimension of the display. In other word, there is no picture or character distortion occurred. Take a 12.1" TFT display panel for example; the real height of the display panel is 20 cm. In the viewing height measurement based on a bright viewing distance (30 cm off the eyeball), both the direct-view image and the projection image is approximately 13 cm respectively. The fundamental difference between the direct-view image and projection image is that the former has a surface reflection or glare from a bright environment light which can cause unnecessary strain because the computer screen will be washed out. The human eye will naturally squint to try to cut through the glare. The latter projection image, on the other hand, will substantially eliminate the glare so that it remarkably reduces the human eye strain and fatigue effect.

Figure 3:
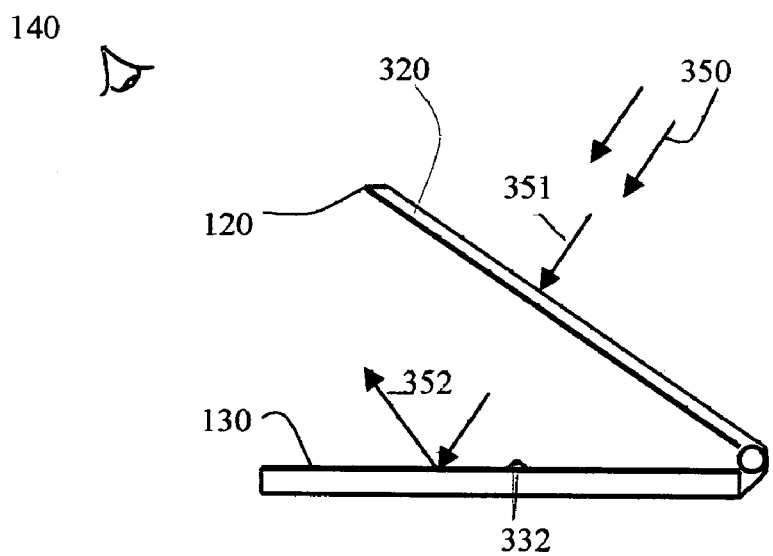
FIG. 3 illustrates a schematic computer structure illuminated by the sun shine or the environmental lighting.

Turning now to FIG. 3, illustrated is a schematic computer structure illuminated by sunlight. The basic structure is the same as the computer structure described previously in FIG. 1, except the fact that the top surface of the computer opens a transparent or translucent window allowing the sunlight 350 to illuminate the display screen. In other word, both sides of the display panel are not opaque to the environment. As shown in FIG. 3, the tilt angle of the display panel is best suitable for the ambient lighting. A plastic 321 is the cover plate to cut off the UV and infra-red component as well as to rugged the display panel. The plastic plate 321 should be substantially transparent to the visible light with the transmission in the range of 90~96%. The CCFL back-lit components including the light guide plate and related functional films (no shown in FIG. 3) may remain the same as the prior art structure since they are basically transparent to the external light.

Environment light 351 represents either indoor sunlight through a window or outdoor sunlight source, which is equivalent to D65 international standard light source. As a matter of fact, the intensity or luminance of the sunlight is many times more than a normal CCFL back lighting of the display unit. There is a photo sensor 332 located at a center of the mirror plate. The luminance of the display will be monitored and controlled simultaneously. In the out-door operation, the built-in back light is automatically switched off. While in the indoor operation, either the built-in back light or the environment lighting may illuminate the display optionally. With the help of the environment light, the back lighting may dim down automatically to a certain level or may be switched off completely, which results in prolonged operation time of the computer based on the same storage capacity of the battery or reduction of the volume of the battery based on the same operation time.

Traditional solution of a sunlight readable computer is to combine many CCFL lamps parallel to boost the display brightness up to 7000 nits. Because of the added lamps, the high brightness LCD creates some undesirable problems, which include high power consumption, excessive heat generation, increased dimensions, electrical circuit alterations, and shortened LCD lifetime. Yet the brightness of 1700 nits is still not high enough for a computer to be directly viewed under the sun shine, it has to be viewed under a shadow. Nevertheless, the volume of the battery and heat sink structure makes the computer too heavy to carry. In the present invention, however, the state of the art adopts an opposite approach to used the sun light instead of competing with it as introduced in the prior art. It takes the full advantage of the solar energy to eliminate the built-in back lighting system so as to turn out a slim and a conservation solution to a portable electronic device. Without the burden of the lighting system, the volume of the battery can be remarkably reduced.

EXPERIMENT 3

A 7" TFT LCD panel of a computer was modified by opening a window on the reflective sheet metal of the display model. The light guide plate and the diffusive layer of the back light system were remaining in the model except the white sheet attached to the reflective sheet metal had been taken out. The device was then put to an overclouded out side environment. The luminance was measured with the backlight switched off. Thus, the brightness of the full color TFT display is totally reliant on the outdoor ambient light. It was surprised that, even though there was no available direct sunshine, the display was still brighter than that it worked in the office with the illumination of the built-in backlight.

The testing was carried out at 2:30 pm in overclouded outdoor Texas. And the temperature was at 72° F. To determine the luminance, a sheet of print paper and a white polyester board were put on the ground as the references. The data is listed as Table 3:

TABLE 3

|  | Y (cd/m$^2$) | x | y |
|---|---|---|---|
| Laser Print Paper | 3944 | .297 | .320 |
| White Board | 6331 | .306 | .333 |
| 7" TFT Outdoor | 224.2 | .322 | .388 |
| 7" TFT Indoor(backlit) | 148.4 | .298 | .337 |

Y represents the luminance and x, y represent the CIE 1931 color coordinates respectively. The photometer being used was the same as example 1.

From Table 3, one can easily realize that with the luminance of 224 nits illuminated by the sun light, the TFT display provides a truly comfortable image in the outdoor environment, which is even brighter than indoor environment (148.4 nits) when the backlighting is on. This is the first time in the history, that a transmissive full-color TFT monitor works outdoor with such a bight image without using built-in backlighting.

Figure 4:
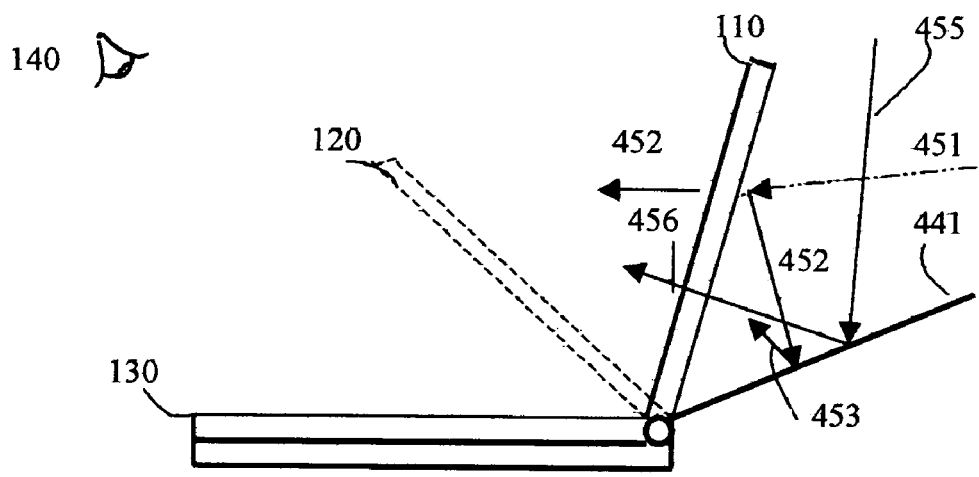
FIG. 4 illustrates a schematic computer structure without built-in backlight system.

Turning now to FIG. 4, illustrated is a schematic computer structure without built-in backlighting system. The basic structure is the same as the computer structure described previously in FIG. 3, except a diffusively reflective plate 411 located behind the display panel to collect the ambient light into the display. This is a key optic component in order for the device working in the direct-view mode in the indoor environment without built-in backlight system. Plate 411 can be of a mirror surface or a specula surface for better reflection, but sometimes it may introduce a shadow from ambient environment to the display. The function of the reflective plate 411 will be described as following. If the plate 411 is omitted, only the light 451 with low tilt angle has a chance to pass through the display panel and turns out to be a imaging light 452 which is insufficient for lighting the display. In addition of the plate 411 the light 455 will be collected and further through the display as the imaging light 456, while the reflective component 453 also has a chance to pass through the display as the imaging light 454. Thus, the brightness of the display is substantially enhanced. As the ambient light, in many occasions, is a partially polarized light, the plate 411 could be a reflective polarizer with predetermined polarity and optical axis with the adjacent polarizer film which attaches onto a standard TFT display panel. It is possible for the ambient light to convert into a polarized light in order for the TFT display to obtain sufficient luminance.

EXPERIMENT 4

In order to prove the feasibility of the direct-view display mode working in the indoor environment without using the built-in backlight system, an experiment was carried out inside a house with southward window at noon time. A 15" TFT monitor at direct-view position was put on the table at the window. The tilt angle of the display panel was 110 degrees to the front surface of the table. In this case, the window light including the sunshine and the blue sky is the only light source to illuminate the display. There are two components of the ambient lighting the direct light 451 from the window and the reflection light 455 from the reflector 411. Therefore, two groups of display luminance data were collected: direct light 451 only and direct light 451 plus reflection light 455. The result is shown in Table 4.

TABLE 4

|  | Y (cd/m$^2$) | x | y | Note |
|---|---|---|---|---|
| TFT White | 163 | .281 | .384 | reflection/direct |
| TFT White | 78.4 | .279 | .383 | direct |
| TFT Black | 11.3 | .302 | .345 |  |

From the table 4, one can immediately recognize that the luminance 163 nits are really enough and the reflector 411 is an essential optical part for the display with sufficient brightness.

EXPERIMENT 5

In order to further test the computing device without built-in backlight, more experiment was carried out via the selection of different types of the reflective 411 plates. The materials are listed as following:

1. Mirror plate
2. diffusive Aluminum coated plastic film
3. diffusive 3M linear polarizer plate
4. Specula cholesteric reflective polarizer film A 7" normally white TFT display without backlighting film and guiding plate was positioned on the top of the above mentioned reflective material respectively with a suitable tilt angle in a standard ambient light condition with CFL tubes. There was no window light involved in this case. It was surprisingly found out that the luminance of the display is remarkably varied. The specula cholesteric reflective polarizer film that properly aligned with the polarizer film on the TFT display panel gave out the best performance. The display was shown a fairy bright color picture. The luminance and the color coordinates are listed in the Table 5.

TABLE 5

| No | Y (cd/m$^2$) | x | y |
|----|--------------|------|------|
| 1  | 92.4         | .396 | .442 |
| 2  | 102          | .401 | .442 |
| 3  | 109          | .397 | .444 |
| 4  | 131          | .398 | .444 |
| 5  | 123          | .395 | .451 |

As a reference printed paper was also measured (Y=135; x=0.384, y=424) at the same time. The conclusion is that, with the addition of the cholesteric reflective polarizer plate, the direct-view TFT display can be of enough brightness in the room lighting condition compared to that with CCFL backlit.

In summary, when the computer is working in the direct-view mode, the display panel is set to the first position 110 and takes on a full color picture without a built-in backlight system; when the computer is working in the projection mode, the display panel is set to the second position 120 which converts to a projection image to a viewer via the mirror plate 130. Please note that the plate 411 can be also worked as the computer's cover plate when it is rotated to the position parallel with display panel as the computer is set off or in standby condition.

There is a common design in FIG. 3 and FIG. 4. Both sides of the display panel are substantially clear to the open air. In other word, both sides are not opaque to the ambient light. This differentiates the skill of the art from the prior art where one side of the display panel is always called "backside" and covered by a opaque plastic or metal parts.

No built-in backlighting is one of the important embodiments of the present invention. Take the full advantage of the sunlight or the ambient light as the display's light source while the display can be viewed directly under the sunlight condition is the mission of the state art technology. The power consumption of the conventional TFT displays is listed in Table 6.

TABLE 6

| Size (inch) | LCD(w) | CCFL Lamp(w) |
|-------------|--------|--------------|
| 6.4         | 0.8    | 3.7          |
| 7.4         | 0.95   | 7.9          |
| 8.4         | 0.8    | 5.5          |
| 10.4        | 0.8    | 6.8          |
| 12.1        | 1      | 14           |
| 15          | 1.5    | 17           |

Take a 10.4" TFT display for example; the display itself consumes 0.8 w, while its backlit system takes 6 w for 350 nits luminance, 8 times more than that of the display panel. For the sake of the energy conservation and the sustainable working time of the portable devices, it is critical for the present invention to get rid of the built-in backlight system.

Figure 5:
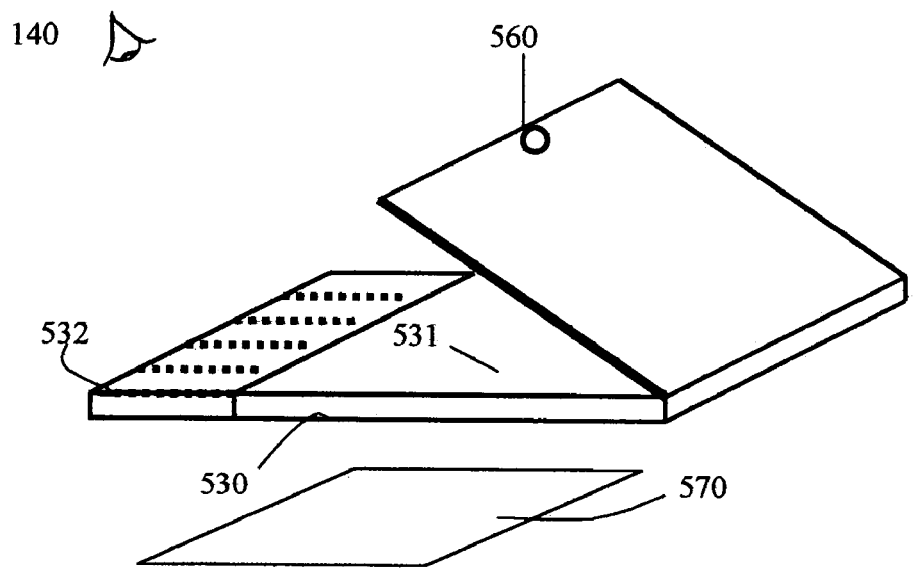
FIG. 5 illustrates schematic structure of a computer with input means.

Turning now to FIG. 5, illustrated is the input means of the present invention. There are four input means in the state of the art computer design: touch screen input, virtual key board input, moveable key board input and transparent film imaging composition. A touch panel with mirror surface 530 is designed to satisfy both the image projection and the data input. The touch screen receives the projection image from the display unit but is physically separated from the display unit. The novel non-transparent touch mirror makes the computer much thinner than the prior art configuration. A virtual key board 531 is actually a portion of a projection image from the display, designed in a predetermined area of the mirror touch panel. The key-in operation is just in the same way of operation on a tablet PC computer whereas the image of the key board is a direct-view image out of the display panel. The touch panel, in the present invention, is physically separated from the display unit with an optimal angle. Therefore, it eliminates the tendency of any damages of the display panel due to an extra pressure or surface scratches. A real key board 532 can be also attached on the computer as an option of the input means.

Most importantly, the present invention creates a new input means, image composition. A transparent film 570 with printing or hand-writing can be put on the top of the mirror panel. Thus, the projection image from the computer screen and the film image will be superimposed together. The combined image will then be sensed by a CCD camera 560 located on the front edge of the display panel. A video sensor system in the computer will carry out the digital image analysis. Finally, the new composite image, including the information on the transparent film 570, will be stored in memory unit or output to the display unit or printing unit.

Figure 6:
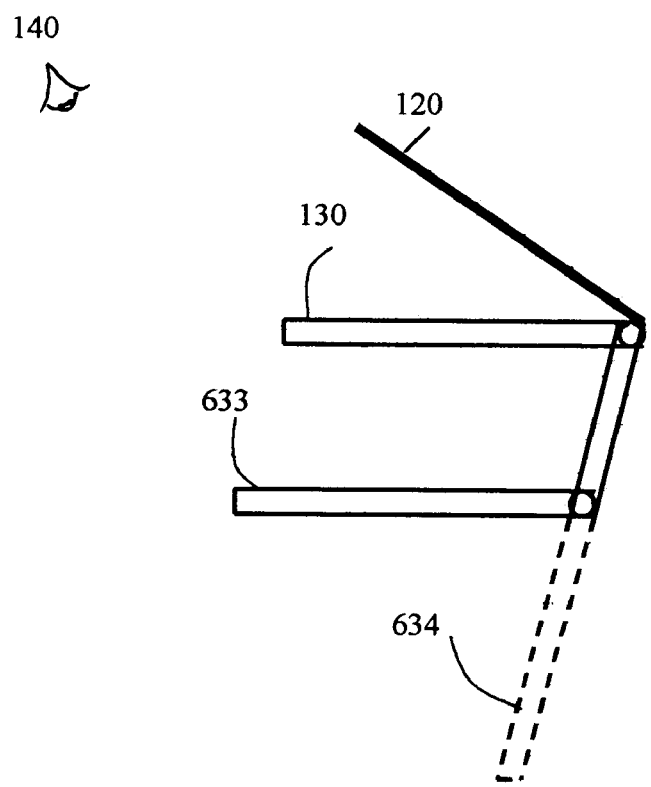
FIG. 6 illustrates schematic structure of a computer with another input means.

Turning now to FIG. 6, illustrated is another input means of the present invention. There is a foldable keyboard or a keypad 633 underneath of the projection mirror plate for further facilitating the data input. For the hand-held input while the user is walking or standing the keyboard may turn easily to the position 634. The keyboard can be wireless. When the input is completed, the device may fold up to its original structure as described in FIG. 3.

Figure 7:
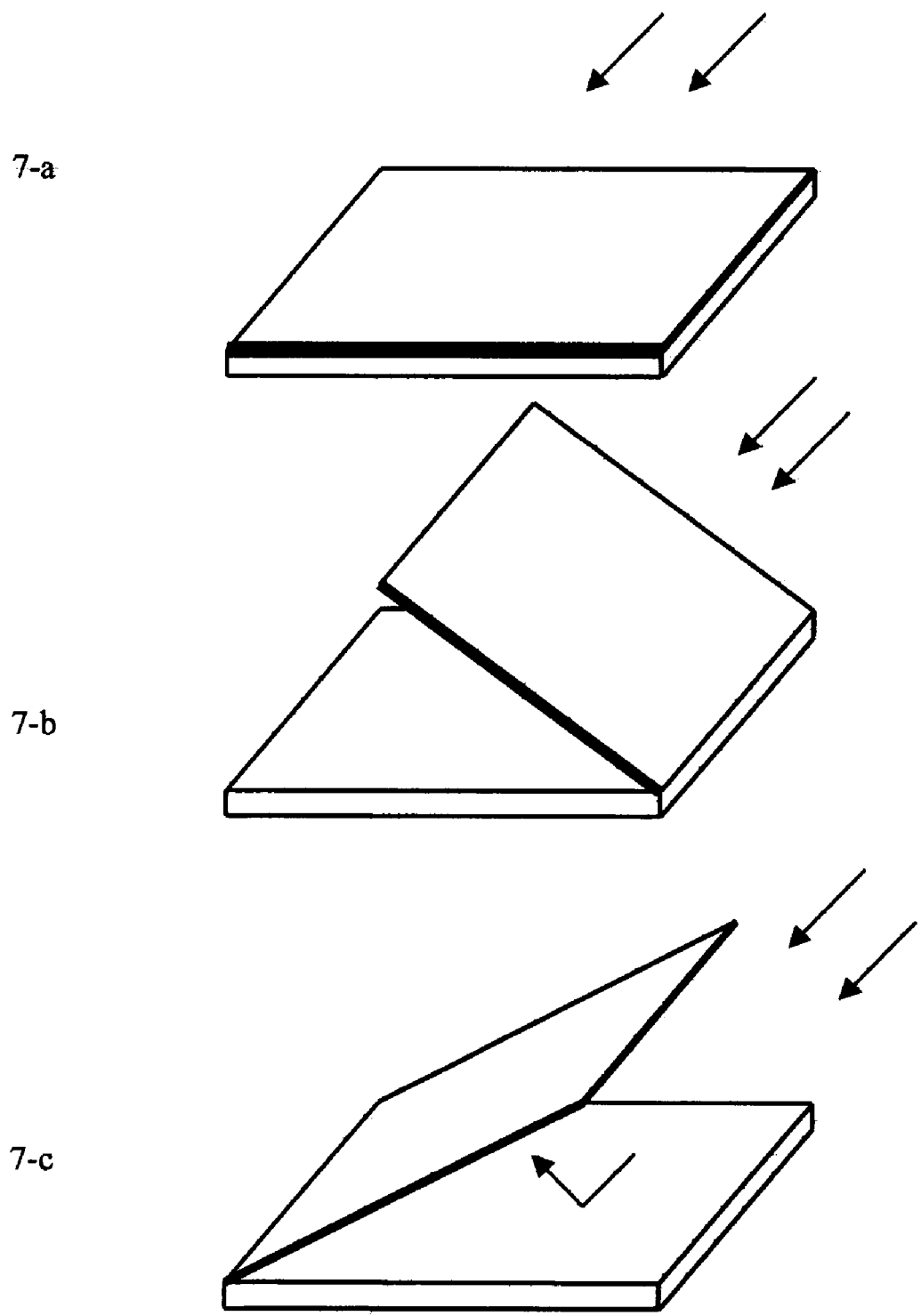
FIG. 7a illustrates a schematic structure of a direct-view tablet computer.
FIG. 7b illustrates a schematic structure of a projection-view tablet computer.
FIG. 7c illustrates a schematic structure of an ambient lighting direct-view tablet computer.

Turning now to FIG. 7, illustrated is a foldable tablet computer. FIG. 7a illustrates a schematic structure of a direct-view tablet computer. There may be touch panel on the top of the tablet computer as the input device as the conventional tablet PC computer.

FIG. 7b illustrates a schematic structure of a projection-view tablet computer device when the display panel rises up. The principle has already described in detail in FIG. 3. There is no need of image conversion from FIGS. 7a to 7b.

FIG. 7c illustrates a schematic structure of a direct-view tablet computer employing an ambient light when the computer rotates 180 degree relative to FIG. 7b. The principle of the drawing has described in detail in FIG. 4. There is necessity to convert the image from the normal scanning to the reverse scanning. The horizontal scanning direction control signal R/L is switched from "High" to "Low" and the vertical scanning direction control signal U/D is switched from "Low" to "High" during the rotation.

Broadly speaking, the structure and the spirit of the state of the present invention are not only suitable for the computer but also for other electronic display devises, such as portable DVD player, TV set, multi-media player, cell phone, GPS and so on.

I claim:

1. A sunlight readable direct-view and projection-view computing device comprising:

a. display panel with at least one angular position;
b. a mirror panel;
c. a mother board chamber with relevant controller,
wherein the mother board chamber and the display panel positioned with a predetermined angle allows the display panel at one angular position to form a direct-view image;
wherein the mirror panel substantially parallel with the mother board chamber separated the display panel with another angular position allows the display image to substantially eliminate the surfacing reflection and to project onto the mirror panel to form a projection image;
wherein the controller automatically converts the data input directions been the direct-view image and the projection image;
whereby the computing device allows a user to discern the direct-view image at one angular position and the projection image at the other one angular position with a sunlight readable high contrast ratio.

2. The sunlight readable computing device as in claim 1 wherein the display panel is a full color transmissive active matrix liquid crystal display.

3. The sunlight readable computing device as in claim 1 wherein the mirror panel is a mirror surface touch screen.

4. The sunlight readable computing device as in claim 1 wherein the angular position between the display panel and the mirror panel in the projection mode is in the range of 30~50 degrees.

5. The sunlight readable computing device as in claim 1 wherein the sunlight readable high contrast ratio means that, under direct sunlight, the CR is in the range of 10~100; in the indoor environment, the CR is in the range of 100~600 as the device is working in the projection mode.

6. The sunlight readable computing device as in claim 1 is a direct-view and projection view portable electronic device.

7. The sunlight readable computing device as in claim 1 the projection mode is a single viewer privacy working mode.

8. The sunlight readable computing device as in claim 1 wherein the direct-view is mainly for the indoor application, while the projection view is both for indoor and outdoor applications.

9. The sunlight readable computing device as in claim 1 further including a CCD imaging system to combine the transparent film image with the projection image as a new image input.

10. Sunlight lighting and sunlight readable direct-view and projection view computing device comprising:
a. a display panel with at least one angular position;
b. a mirror panel;
c. a motherboard chamber with relevant controller,
wherein the display panel is substantially transparent with its two sides to the ambient light allowing the sunlight to illuminate the display from one side of the display;
wherein the mother board chamber and the display panel positioned with a predetermined angle allows the display panel at one angular position to form a direct-view image;
wherein the mirror panel substantially parallel with the mother board chamber separated the display panel with another angular position allows the display image to substantially eliminate the surfacing refection and to project onto the mirror panel to form a projection image;
wherein the controller automatically converts the data input directions between the direct-view image and the projection image;
whereby the computing device allows a user to discern the direct-view image at one angular position and the projection image at the other one angular position from the other side of the display opposite to the sunlight impingement.

11. The sunlight lighting and sunlight readable computing device as in claim 10 wherein the display panel is a full color transmissive display without using built-in backlight components.

12. The computing device as claim 10 further including a reflecting with a predetermined angle with the display panel to enhance luminance of the display.

13. The computing device as in claim 12 wherein the reflecting plate is a mirror plate.

14. The computing device as in claim 12 wherein the reflecting plate is a diffusive reflective metal plate.

15. The computing device as in claim 12 wherein the reflecting plate is a reflective polarizer plate.

16. The computing device as in claim 12 wherein the reflecting plate is a cholesteric reflective polarizer plate.

17. The computing device as in claim 12 wherein the predetermined angle is in a range of 30~70 degrees, more specifically, 40~50 degrees.

18. The computing device as in claim 10 wherein the display panel is substantially transparent with its two sides to the ambient light also allows the artificial ambient light to illuminate the display.

19. The computing device as in claim 10 is a sunlight readable tablet computing device.

20. The computing device as in claim 10 is a sunlight readable super slim hand-held video device.

* * * * *